Patented Oct. 27, 1942

2,299,764

UNITED STATES PATENT OFFICE 2,299,764

OPAQUING AGENT FOR ENAMELS AND PROCESS FOR MANUFACTURING SAME

Maxime Piquet, Saint-Maure-des-Fosses, France

No Drawing. Application April 29, 1939, Serial No. 270,923. In France May 5, 1938

18 Claims. (Cl. 106—312)

The invention relates to a group of novel white opaquing agents which can be used in the fine arts in general and more particularly for rendering opaque vitrified enamels, ceramic ware, etc., and to the method of preparing these pigments.

It is known that cerium oxide ($CeO_2$) is used as an opaquing agent that it is successfully used in particular in vitrified enamels, since its opaquing power is very considerable.

I have now found that if it is very intimately dispersed with other white refractory oxides, and more particularly with magnesia, it is possible to obtain products which are still more suitable for pigmentary use in general, and more particularly for rendering vitrified enamels opaque. The products obtained are, in fact, practically white, very fine and light, whereas cerium oxide is of a yellowish colour, moreover varying considerably with its method of preparation, and may assume an agglutinated form by calcination. Furthermore, cerium oxide, after calcination is denser and more difficult to disperse in the enamel.

In the novel products, the opaquing power, relatively to the cerium oxide content, is very substantially increased. In favourable cases, the same opacity of the enamel can be obtained with a much smaller quantity of cerium oxide that has been treated by the process of this case, than would be necessary if the cerium oxide were used pure.

Various oxides have already been proposed for increasing the opaquing power of cerium oxide, but they have only given insufficient results.

According to the present invention, in order to increase the opaquing power of cerium oxide, an addition of magnesia (or of a substance capable of supplying magnesia by calcination) is used, either alone, or with other oxides.

An intimate mixture giving satisfactory results can be obtained by simply crushing $CeO_2$ and MgO, or a magnesium compound capable of supplying this oxide by calcination, but the preferred embodiment which leads to the best results consists in calcining, at a temperature of 800 to 1500° and preferably at about 1,000 to 1,200° C., a mixture of preferably non-calcined cerium oxide or of compounds capable of supplying said oxide by calcination, and magnesia or a compound capable of supplying magnesia by calcination.

The mixture must be intimately effected before calcination, which is obtained by a thorough crushing in the moist state. It is very advantageous to effect this crushing in the presence of magnesium salts, such as the sulphate or the chloride, which, by acting on the magnesia, are capable of forming binders and which, owing to this fact, appear to exercise a dispersing action on the cerium compound. The favourable soluble magnesium salts can, moreover, be formed in situ, by the action on the magnesia of the acid contained in the cerium precipitate, if as a starting material a cerium precipitate is used which is obtained by hydrolysis of a ceric solution and which always retains, even after washing, a certain quantity of absorbed acid.

According to the applicant's observations, in the products obtained in this manner, the association of the $CeO_2$ and of the magnesia, and also, contingently, of the other associated oxides, is so intimate that, although there is no chemical combination, the particles of pigment that are visible under the microscope contain at the same time the components of the mixture, as can be ascertained by measuring their refractive index.

In the case of a mixture with magnesia alone, the following results have, in fact, been found:

For the red line of lithium, the refractive index for MgO is 1.75 and for $CeO_2$ of usual manufacture 2.33.

If these two products are mixed without special precautions the determination under a microscope of the refractive indices of the particles enables the two components to be identified.

On the contrary, in the product prepared according to the present process, all the particles have an index between 2.05 and 2.20, the majority having an index of about 2.1.

The same observations may be made on ternary or complex mixtures, however the more components the mixture contains, the more difficult it will be to interpret the results.

If a series of compositions are made up, using 1 gram-molecule of uncalcined $CeO_2$ with 0.5, 1, 2, 3, etc. gram-molecules of MgO, the mixing in each case being effected by crushing in water and the mixtures each calcined at the temperature indicated which is variable with the composition, it is found that the opaquing power for enamel of the cerium oxide present in the mixture increases with the MgO content, at first quickly, then more slowly and reaches a limit beyond which a further addition of MgO has no other effect than of diluting the opaquing agent; at the same time, the colour of the product changes from yellowish-white to pure white and the fineness, and also the other desirable properties evolve in a manner which is favourable for introducing it into enamel and confer properties which are valuable for the application of same.

The same effect persists or is accentuated if, instead of preparing a binary mixture CeO—MgO, more complex mixtures are prepared by adding other constituents, but in which these two essential components remain associated. The additional constituents added besides magnesia are preferably fixed white oxides, in a proportion exceeding 10% such as aluminium or tin oxides. A remarkable effect is obtaind for example with a mixture having a composition between these represented by the formulae $CeO_2.Al_2O_3.MgO$, and $CeO_2.Al_2O_3.2MgO$. The necessary alumina can be supplied by a preferably colloidal silicate of alumina.

The cerium oxide which is suitable as a starting material is a pure, or substantially pure cerium oxide, that is to say from which the other rare earth metals have been removed and which only contains a proportion of same that does not affect its colour. For the desired use however it is advantageously accompanied by substances such as: water, acids, colourless salts, etc. The presence of $SO_3$, colourless sulphates or chlorides may even exercise a very favourable action.

Such an oxide is obtained, for example, by hydrolysing a solution of rare earth metal salts wherein the cerium is in the ceric state and wherein, consequently, it is the only one to be precipitated, and by washing the precipitate until the desired purity is obtained. The product obtained, which consists of a hydrated ceric oxide or contingently an insoluble basic cerium salt, is an excellent starting material for carrying out the invention, however, the invention is not limited to this starting material and covers the use of any cerium compound which gives the oxide by calcination.

The magnesia used may be light or heavy, it would appear that this latter quality has given better results, but the present invention is not restricted to its use. Magnesium carbonate, or any magnesium compound capable of supplying the oxide by calcination, may also be successfully used.

The particular function performed by the magnesia in this respect is remarkable and novel, as also is the effect of additions exceeding 10% of appropriate fixed white oxides, as described.

Example I

Take:

| | Parts |
|---|---|
| Hydrated cerium oxide obtained by the hydrolysis of a ceric salt and containing about 85% of $CeO_2$ the remainder being essentially formed by volatile substances (water and acids) | 136 |
| Heavy calcined magnesia | 27 |
| Water | 150 |

Intimately grind the mixture in a ball-grinder, then partly separate the water by filtration, collect the cake, dry it, then calcine at 1,150°/1,200° centigrade, in an oven having an oxidizing atmosphere in such a manner that the product remains at this temperature for about 1½ hours.

After cooling, the product has the appearance of a light, white and very friable powder. It can be directly used as an opaquing agent without other preparation, that is to say without a special grinding being necessary before using it in the mill.

Example II

Take:

| | Parts |
|---|---|
| Cerium oxide, identical with the previous case | 136 |
| Hydrated alumina containing 66% of $Al_2O_3$ | 104 |
| Heavy calcined magnesia | 54 |
| Water | 180 |

The mixture is ground, dried and calcined as in Example I.

After cooling, the product has the appearance of a light, very white and very friable powder.

No other preparation is required for its use as an opaquing agent.

Example III

The product prepared as described in Example I is placed in suspension in dilute hydrochloric acid. The magnesia dissolves. The cerium oxide is collected, washed and dried. It can be used in the enamel industry and when used, it is found to possess a greater opaquing power than that of a calcined cerium oxide without additions and approximating to that which it possessed in the mixture obtained according to Example I.

The invention covers by way of new industrial products the opaquing agents thus manufactured and constituted and also the enamels obtained by means of said opaquing agents.

The opaquing agents prepared according to the present invention offer, amongst others, the following qualities: the opaquing power due to the cerium oxide is increased, a fact which, other things being moreover the same allows of a reduction of the cost, it offers an excellent facility of use and in particular the coat does not tend to run when it is applied; finally, resistance to baking is increased.

I claim:

1. A process for preparing an opaquing agent for enamels, which process comprises the steps of intimately mixing cerium oxide with magnesia, and calcining the mixture.

2. A process for preparing an opaquing agent for enamels, comprising the steps of intimately mixing with magnesia a substance capable of producing cerium oxide by calcination, and calcining the mixture.

3. A process for preparing an opaquing agent for enamels, comprising the steps of intimately mixing cerium oxide with a substance capable of producing magnesia by calcination, and calcining the mixture.

4. A process for preparing an opaquing agent for enamels, comprising the steps of intimately mixing a substance capable of producing cerium oxide by calcination, with a substance capable of producing magnesia by calcination, and calcining the mixture.

5. A process for preparing an opaquing agent for enamels, comprising the steps of intimately mixing cerium oxide with magnesia, grinding the mixture in a moist state, and calcining at a temperature of between 800° C. and 1500° C.

6. A process for preparing an opaquing agent for enamels, comprising the steps of intimately mixing cerium oxide with magnesia, grinding the mixture in a moist state, and calcining at a temperature of between 1000° and 1200° C.

7. A process for preparing an opaquing agent for enamels, comprising the steps of intimately mixing cerium oxide with magnesia, adding to the mixture a magnesium salt capable of forming a binder with the magnesia, and calcining the mixture.

8. A process for preparing an opaquing agent for enamels, comprising the steps of intimately mixing cerium oxide with magnesia, adding to the mixture a magnesium salt selected from the group consisting of magnesium sulphate and magnesium chloride, capable of forming a binder with the magnesia, and calcining the mixture.

9. Process according to claim 1, wherein the cerium oxide is used in the state of a precipitate obtained by hydrolysis of a ceric solution.

10. A process for preparing an opaquing agent for enamels, comprising the steps of intimately mixing cerium oxide with magnesia, adding to the mixture at least 10% of fixed white oxide, and calcining the mixture.

11. A process for preparing an opaquing agent for enamels, comprising the steps of intimately mixing cerium oxide with magnesia, adding to the mixture at least 10% of a fixed white oxide selected from the group consisting of the oxides of aluminum and tin, and calcining the mixture.

12. A process for preparing an opaquing agent for enamels, comprising the steps of intimately mixing cerium oxide with magnesia, adding alumina thereto, in such proportions that the mixture formed has a composition between $CeO_2Al_2O_3 1MgO$ and $CeO_2Al_2O_3 2MgO$ and calcining the mixture.

13. Process according to claim 12, wherein the alumina is added in the form of fine silicate of alumina.

14. Process according to claim 12, wherein the alumina is added in the form of fine silicate of alumina.

15. Process according to claim 1, wherein the ratio of the molecules of cerium oxide to the molecules of magnesia is between 2 and $\frac{1}{4}$.

16. Process according to claim 1, wherein after mixing and calcination, the MgO is dissolved out of the calcined material, and the remaining cerium oxide is used as an opaquing agent.

17. Process according to claim 1, wherein after mixing and calcination, the MgO is dissolved out of the calcined material by treatment with hydrochloric acid, and the remaining cerium oxide is used as an opaquing agent.

18. An opacifier for enamels containing cerium oxide and magnesium oxide, said oxides being in intimate association with each other, and in the form of fine particles, said particles having an index of refraction for the red line of lithium between 2.05 and 2.20, with the majority of said particles having an index of refraction of about 2.1 for the red line of lithium, and the said cerium oxide and magnesium oxide being present as such in the opacifier.

MAXIME PÂQUET.